(12) United States Patent  (10) Patent No.: US 6,592,495 B2
Jeon  (45) Date of Patent: Jul. 15, 2003

(54) BRAKE SYSTEM OF VEHICLE

(75) Inventor: Ig-kyun Jeon, Kyunggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/045,470

(22) Filed: Oct. 22, 2001

(65) Prior Publication Data

US 2003/0036459 A1 Feb. 20, 2003

(30) Foreign Application Priority Data

Aug. 16, 2001 (KR) .......................................... 2001-49279

(51) Int. Cl.[7] .......................... B60K 41/20; F16D 65/30; B60T 7/04
(52) U.S. Cl. ....................... 477/197; 477/194; 180/333; 74/560; 188/265
(58) Field of Search .................... 74/478, 512, 560; 477/194, 195, 197, 906; 188/106 F, 265; 192/219.7; 180/333

(56) References Cited

U.S. PATENT DOCUMENTS 4,301,901 A  * 11/1981 Jensen ..................... 192/219.6
4,462,487 A  *  7/1984 Warwick et al. ............ 477/194
6,223,865 B1 *  5/2001 Lang et al. .................... 74/512

* cited by examiner

Primary Examiner—Ankur Parekh
(74) Attorney, Agent, or Firm—Davis & Bujold, P.L.L.C.

(57) ABSTRACT

Disclosed is a brake system of a vehicle. The present invention includes parking brake interlocking mechanism being installed on a pedal assembly of a main brake and the parking brake interlocking mechanism is interlocked with a brake pedal so as for the parking brake to be operated in a brake pedal operation rear range beyond a brake pedal operation range during normal driving or traveling, a locking mechanism for preventing the interlocking mechanism from being returned when the parking brake is operated, and a locking control for releasing the locking of the locking mechanism when an accelerator pedal is operated. Therefore, the present invention has advantages of improving stability and convenience by interlocking a parking brake which is an auxiliary brake with a main brake by a brake pedal, substituting the parking brake for the main brake by just the brake pedal when a main brake body is critically damaged, and operating and releasing the parking brake by just the brake pedal and an accelerator pedal in a so-called stop frequent operation.

4 Claims, 6 Drawing Sheets

BRAKE SYSTEM OF VEHICLE

BACKGROUND OF THE INVENTION

1. Field of the Invention

The present invention relates to a brake system of a vehicle, and more particularly, to a brake system of a vehicle capable of improving stability and convenience by interlocking a parking brake which is an auxiliary brake with a main brake by a brake pedal, substituting the parking brake for the main brake by just the brake pedal when a main brake body is critically damaged, and operating and releasing the parking brake by just the brake pedal and an accelerator pedal in a so-called stop frequent operation.

2. Background of the Related Art

In general, a brake system of a vehicle is roughly divided into an operating mechanism and a brake body, with a power transmitting line being formed between the operating mechanism and the brake body to transmit or double an actuating force of the operating mechanism.

Here, the power transmitting line is classified into a hydraulic line and a pneumatic line according to a transmission medium. The hydraulic line includes a master cylinder as an operating medium which generates a hydraulic pressure when a brake pedal is pushed with a foot. The pneumatic line includes a valve assembly as an operating medium which controls a transfer line of a pneumatic pressure when the brake pedal is pushed with a foot.

The conventional art will be explained in detail by taking the brake system including the hydraulic line as an example. FIG. 1 illustrates a brake system of a vehicle with a disk brake, in which a caliper is used as a main brake body 10 and a braking shoe 3 is used as a parking brake body 16.

The conventional brake system is divided into a main brake and a parking brake which is an auxiliary brake. A servomechanism 5 is installed on a hydraulic line 4 of the main brake to increase a leg power on a brake pedal 14.

Meantime, in the auxiliary brake, a lever and a pedal are used as an operating mechanism for braking with an operating force of a cable 18. Illustrated is a parking brake pedal 6 used as the operating mechanism.

The parking brake brakes in a manner that the operating force of the operating mechanism is increased based on a lever principle and thus the brake shoe 3 is compressed.

The parking brake is generally provided with a ratchet for locking to operate operating means and continue the braked state, and with separate ratchet release means to release the locked state according to a users need.

Here, it should be known that the present invention is not restricted to the disk-type brake body or the pedal-type parking brake, and the power transmitting line is not confined to the hydraulic line.

By the way, since the main brake is separated from the auxiliary brake in operation, in an urgent case when the power transmitting line of the main brake is critically damaged, the auxiliary brake is not efficiently operated.

For further detailed explanation, the brake body 10 which is subject to the operation of the main brake as previously discussed is operated in such a fashion that the leg power of the brake pedal 14 is increased through the servomechanism and transmitted to the brake body 10 through the power transmitting line.

If the hydraulic pressure, however, cannot be transmitted since the hydraulic line is critically damaged, the brake body cannot be operated even if the brake pedal 14 is operated. At this time, an engine brake and a parking brake function as substitute brake means.

However, a shocked driver does not retain enough composure to operate the engine brake and the parking brake in general, but just continuously operates the disabled brake pedal, leading to an accident. Ordinary people other than a skilled person find it difficult to use the substitute means for the main brake in a flurry.

In particular, even though the parking brake is useful substitute means capable of performing simple operation and braking, in contrast to the engine brake, the parking brake has not been efficiently used during the urgent situation since the parking brake is separated in operation from the brake pedal 14 which is operated during a drive or while traveling.

Further, the conventional brake system causes inconvenience during a downtown drive in a so-called stop frequent operation since the main brake and the auxiliary brake are separated from each other in operation.

For a more detailed description, there are generally many stop or parking sections during the downtown drive. At each stop operation, the brake pedal 14 should be continuously pushed during a stoppage time, for example, during a stop signal, in order to operate the brake body 10, thereby resulting in inconvenience of the users leg.

In this case, the auxiliary brake is used, such that the parking brake pedal is pushed in a condition that a gear is converted into a neutral mode to operate the parking brake body 16. At a point of starting, a release lever 7 is used to release the operation of the parking brake for starting.

In the so-called stop frequent operations, the parking brake is required to be repeatedly operated, which is inconvenient for the user.

This is because of features of the parking brake, in which the parking brake requires additional locking means to maintain a brake force for continuous parking, in contrast to the main brake whose brake force is automatically released when the user removes his foot from the main brake.

The conventional art, therefore, has a disadvantage of being inconvenient to the user in using both the parking brake and the main brake in the so-called stop frequent operations since the repeated operation of the parking brake and the continuous usage of the main brake are needed in the sections.

SUMMARY OF THE INVENTION

Accordingly, the present invention is directed to a brake system of a vehicle that substantially obviates one or more problems due to limitations and disadvantages of the related art.

An object of the present invention is to provide a brake system of a vehicle capable of improving stability and convenience by interlocking a parking brake which is an auxiliary brake with a main brake by a brake pedal, substituting the parking brake for the main brake by just the brake pedal when a main brake body is critically damaged, and operating and releasing the parking brake by just the brake pedal and an accelerator pedal in a so-called stop frequent operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a brake system of a vehicle including parking brake interlocking means being installed on a pedal assembly of a main brake wherein the parking brake interlocking means is interlocked with a brake pedal so as for the parking brake to be operated in a brake pedal operation rear range beyond a brake pedal operation range during a normal drive condition, locking means for preventing the interlocking means from being returned when the parking brake is operated, and locking control means for releasing the locking of the locking means when an accelerator pedal is operated It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
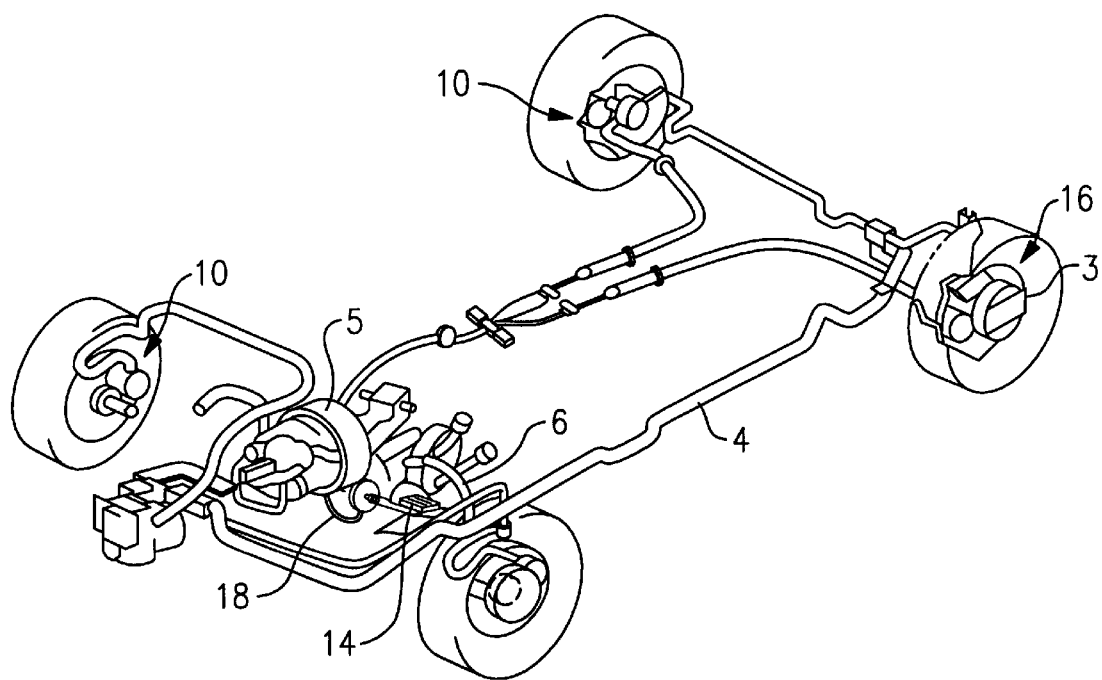
FIG. 1 illustrates an explanatory view of a conventional brake system in which a main brake and an auxiliary brake are installed to have different operating means.
Figure 2:
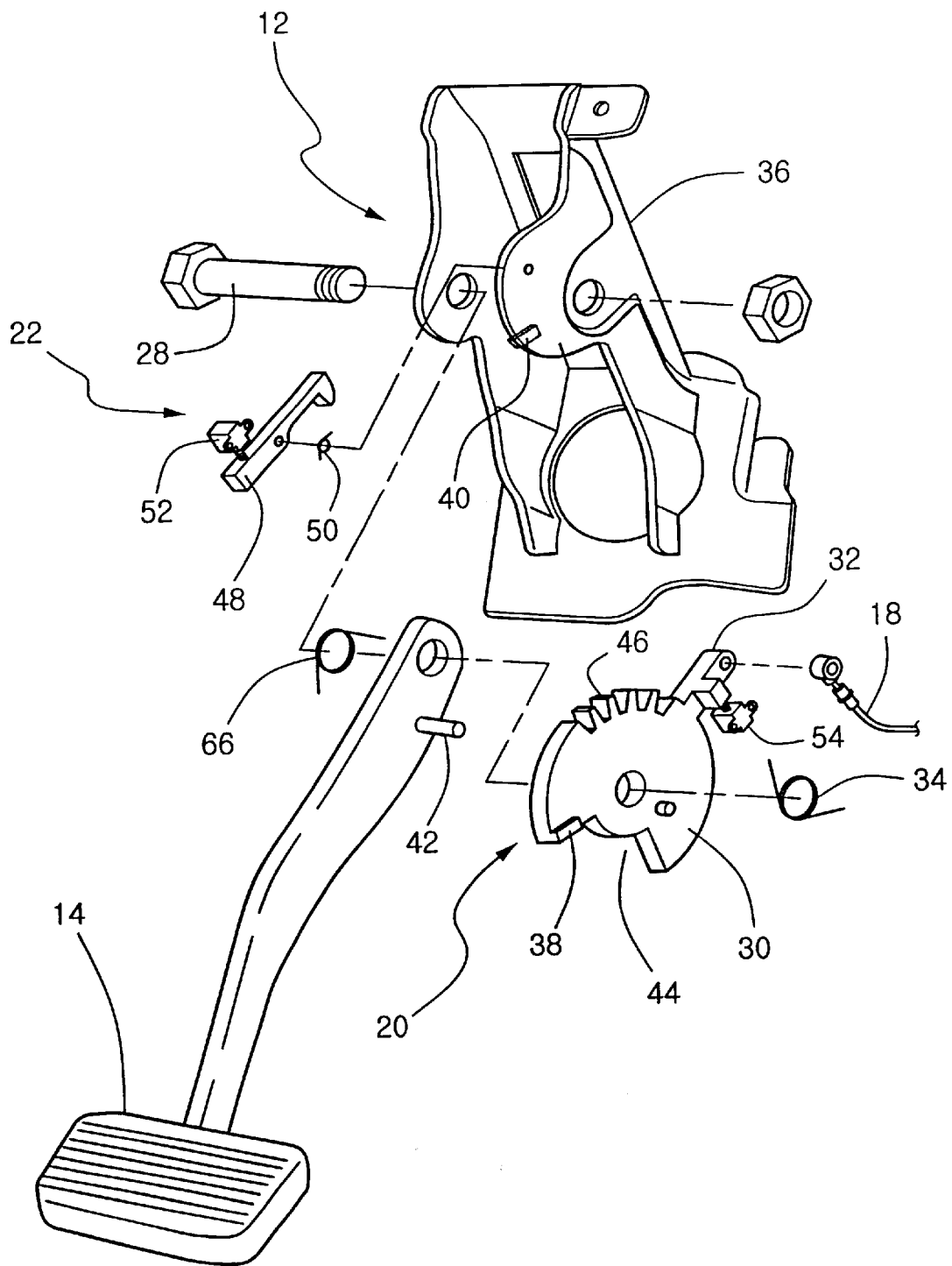
FIG. 2 illustrates an explanatory view of a brake system according to the present invention.

FIG. 2 is a conceptual view of a brake system according to the present invention. FIG. 3 is an explanatory view of a state that the brake system is operated according to the present invention. FIG. 4 is a conceptual view of locking control means according to the present invention.

The brake system of a vehicle according to the present invention comprises a pedal 14 being included in a brake pedal assembly 12 which operates a main brake body 10, parking brake interlocking means 20 for operating a cable 18 of a parking brake in a brake pedal operation rear range b beyond a brake pedal operation range a during a normal drive so as for a parking brake body 16 to be operated by the brake pedal 14, locking means 22 for preventing the parking brake interlocking means 20 from being returned so as for the operation of the parking brake to be continuously maintained when the parking brake is operated by the parking brake interlocking means 20, and locking control means 26 for controlling the locking means 22 so as for the operation of the parking brake to be released by an accelerator pedal 24 when the parking brake is operated.

As previously described, the present invention provides the vehicle brake system in which the parking brake body 16 is operated by the brake pedal 14 of the main brake.

For this, according to the present invention, the parking brake interlocking means 20 is installed on the brake pedal assembly 12 to operate the cable 18 of the parking brake in the brake pedal operation rear range b exceeding the brake pedal operation range a in the normal drive condition.

Here, the operation rear range b is determined in an experimental manner. The operation rear range signifies a brake pedal operation range made for the purpose of letting a driver recognizing operation of the parking brake and commonly used in operating the parking brake in excess of the brake pedal range a during the normal drive in a whole operation range c.

That is to say, the present invention puts the parking brake operation range in the whole operation range of the brake pedal 14, such that the parking brake body 16 gets to be operated by the parking brake interlocking means 20 when the brake pedal 14 is operated in the operation rear range b.

This is because the operation of the parking brake should be separated due to its fundamental properties even though the brake operation needs to be unified.

That is, a desire to operate the main brake for braking during the drive is clearly different from a desire to operate the parking brake for stopping or parking.

Thus, the driver has to certainly recognize that he/she should operate the parking brake accordingly with his/her own desire. The present invention maximizes convenience in that operation.

Accordingly, the brake pedal operation rear range b is assigned to the parking brake operation range within which the parking brake is operated. The brake pedal operation range a does not extend over the whole range c during the normal drive or traveling, such that if the brake pedal 14 is operated up to the rear range b, a sudden stop is needed by a rapid operation because it is not a normal operation range.

For this reason, the brake pedal operation rear range b becomes the parking brake operation range commonly used for the driver to recognize.

The parking brake operation rear range b is determined in the experimental manner according to brake performance of the vehicle in consideration of the driver s operating habit. In general, the parking brake operation rear range b extends to two thirds or more of the brake pedal operation whole range c.

Meanwhile, in the parking brake interlocking means 20 for operation in the rear range b, a control arm 30 is first coupled with a pivot axis 28 to be freely rotated and the cable 18 of the parking brake is coupled with the control arm 30 by means of a cable lever 32.

For this, a rotation medium, such as, a bearing (not shown) or a bushing (not shown), is desirably coupled with a connecting part between the pivot axis 28 and the control arm 30.

As the control arm 30 is coupled with a bracket 36 by an elastic return spring 34, a release position which is an initial position is determined by stoppers 38 and 40.

An interlocking lever 42 is installed on the brake pedal 14 to interlock the control arm 30 in the rear range b.

The interlocking lever 42 is integrated with a cut section 44 of the control arm 30, to rotate the control arm 30 as determined by the brake pedal operation rear range b.

In consequence, operation of the brake pedal 14 within the range determined by the cut section 44 does not affect the control arm 30 at all.

In the meantime, if the brake pedal 14 is operated in excess of the range, the interlocking lever 42 rotates the control arm 30 in the rear range b and the control arm 30 pulls the cable 18 which operates the parking brake.

Next, the parking brake interlocking means 20 is linked with the locking means 22, which comprises a latch groove 46 formed on an outer peripheral surface of the control arm 30 and a latch lever 48 engaged with the latch groove 46. Elastic means 50 is provided in the latch lever 48 to apply an elastic force for that engagement with the latch groove 46.

In this manner, when the control arm 30 is rotated by the brake pedal 14, the control arm 30 is prevented from being returned by the locking means 22 so as to maintain the parking brake continuously engaged, even though the elastic return means 34 uses the control arm 30 to be returned.

Of course, the brake pedal is returned by an existing return spring 66 after operating the control arm 30.

In the meanwhile, after the parking brake is lockingly engaged by the brake pedal 14, there is needed means for releasing the engagement as the driver desires. For this, the locking means 22 is linked with the locking control means 26.

The locking control means 26 comprises an actuator 52 which is output means having a release force exceeding that of the elastic means 50 of the latch lever 48, a parking brake switch 54 which is input means for recognizing operating condition of the parking brake, an accelerator switch 56 which is input means for recognizing an operating condition of the accelerator pedal 24, and a control unit 58 which supplies a power to the actuator 52 which is the output means only when a contact signal between the parking brake switch 54 and the accelerator switch 56 which are the input means is sent.

Accordingly, the present invention employs the accelerator pedal 24 to release the locking of the parking brake, so that driving is achievable at the same time when the locking engagement of the parking brake is released without operating a separate lever.

As a matter of course, there may be other means for determining the release of the parking brake.

By way of example, the driver may judge whether a speed change mode of a speed change gear is changed from a neutral mode or a parking mode into a driving mode. This may be adopted as a locking release condition of the parking brake.

However, if the locking engagement of the parking brake is released when the speed change mode is converted into the driving mode on a sloping road, it will increase a risk of accidents.

Therefore, the driver s final driving desire is proved by operation of the accelerator pedal 24. As a result, according to the present invention, when the accelerator pedal 24 is operated, the locking engagement is released by the actuator 52.

A solenoid actuator is generally used as the actuator 52 which is the output means.

If power is supplied in the solenoid actuator 52, a movable piston 60 is extended whereas if the power is cut off, the movable piston 60 is returned by return means 62.

Here, it is naturally required that the protrusion force of the movable core 60 exceeds the elastic force of the elastic means 50 installed on the latch lever 48.

The engagement between the latch lever 48 and the latch groove 46 is released by the actuator 52. The control arm 30 is returned to the initial position due to the elastic force of the elastic return means 34.

Meanwhile, the locking engagement of the parking brake is released by the actuator in a manner that the accelerator switch 56 is taken as input means in the locking control means 26 to sense whether the vehicle accelerator pedal 24 starts to be operated.

Further, the parking brake switch 54 is also taken as input means while being a pre-conditional component for control.

Otherwise, the actuator is operated whenever the accelerator pedal 24 is operated unless engagement of the parking brake is necessarily taken into account. Accordingly, if the accelerator pedal 24 is operated while the parking brake is operated, the locking engagement of the parking brake is released.

The parking brake switch 54 is also a necessary component installed on the parking brake system. The parking brake switch 54 serves as signal output means for turning on a brake operation lamp (not shown) in an instrument board within a cabin space when the parking brake is operated.

A regular short circuiting switch called an NC switch is applicable to the parking brake switch 54 or the accelerator switch 56. If the accelerator pedal 24 or the control arm 30 is operated, a short circuit push button 68 is returned by return means 64 when the accelerator pedal 24 or the control arm 30 is operated, so that a contact is carried out.

A control unit 58 interposed between the actuator 52, and the parking brake switch 54 and the accelerator switch 56 is composed of a simple and circuit. Accordingly, if the accelerator switch 56 is contacted under a condition that the parking brake switch 54 is contacted, power is supplied to the actuator 52, thereby releasing the locking engagement.

Thus, in the event that the parking brake switch 54 is not activated, the supply toward the actuator 52 is cut off even though the accelerator switch 56 is activated. The condition that the parking brake switch 54 is not activated signifies that the parking brake is not operated. In this case, even if the accelerator pedal 24 is operated, the actuator 52 is not operated.

Meanwhile, a throttle position sensor (not drawn) may become a substitute for the accelerator switch 56.

The throttle position sensor senses an opened condition of a throttle valve according to operation of the accelerator pedal. An output signal of the throttle position sensor may be possibly used. It should be noted that the throttle position sensor is included in the accelerator switch for sensing the operation of the accelerator pedal, in a broad sense.

Operation of the present invention will be collectively explained herein below.

Figure 3A:
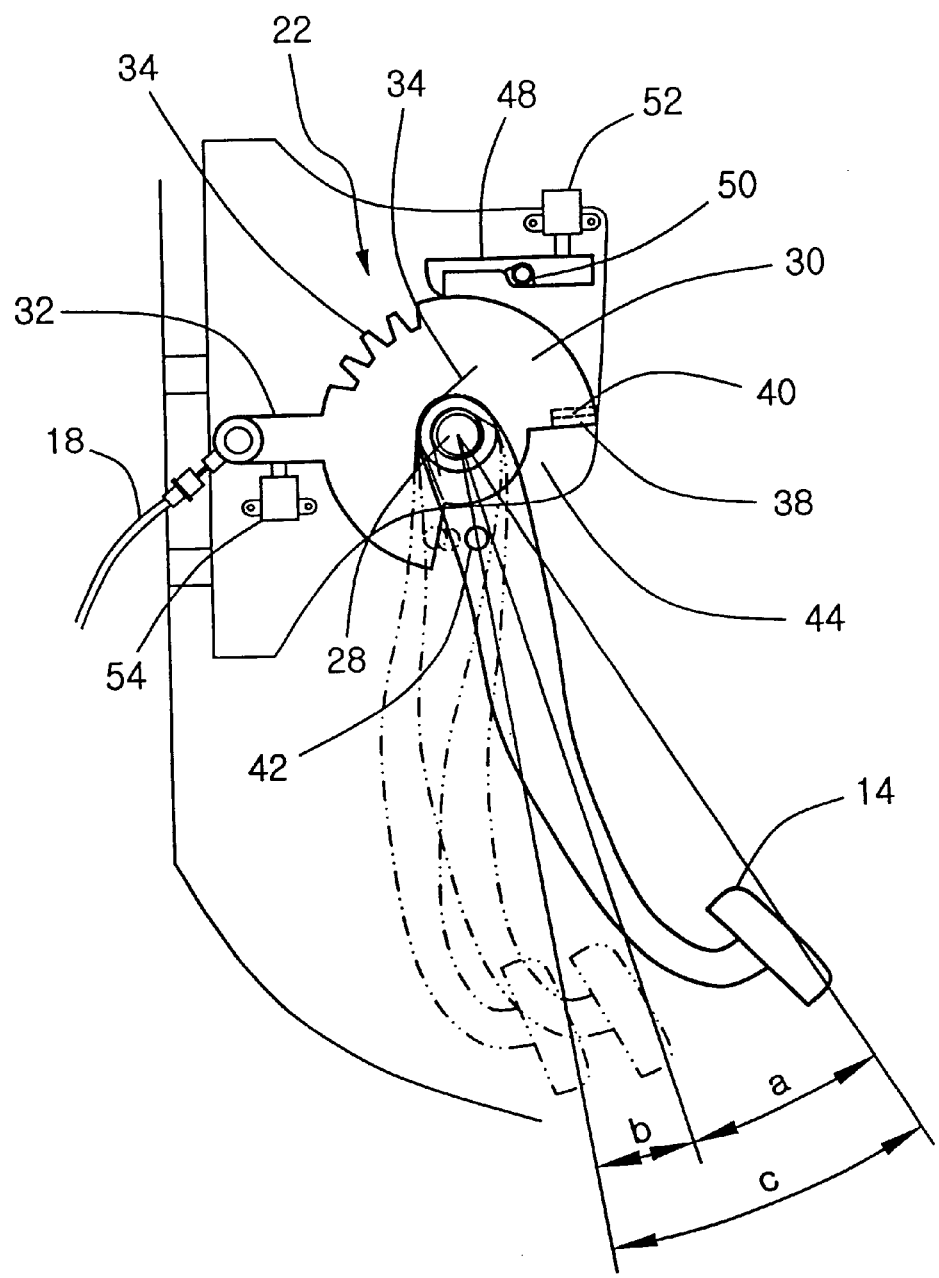
FIG. 3 illustrates an explanatory view of a state that the brake system is operated according to the present invention.
Figure 4:
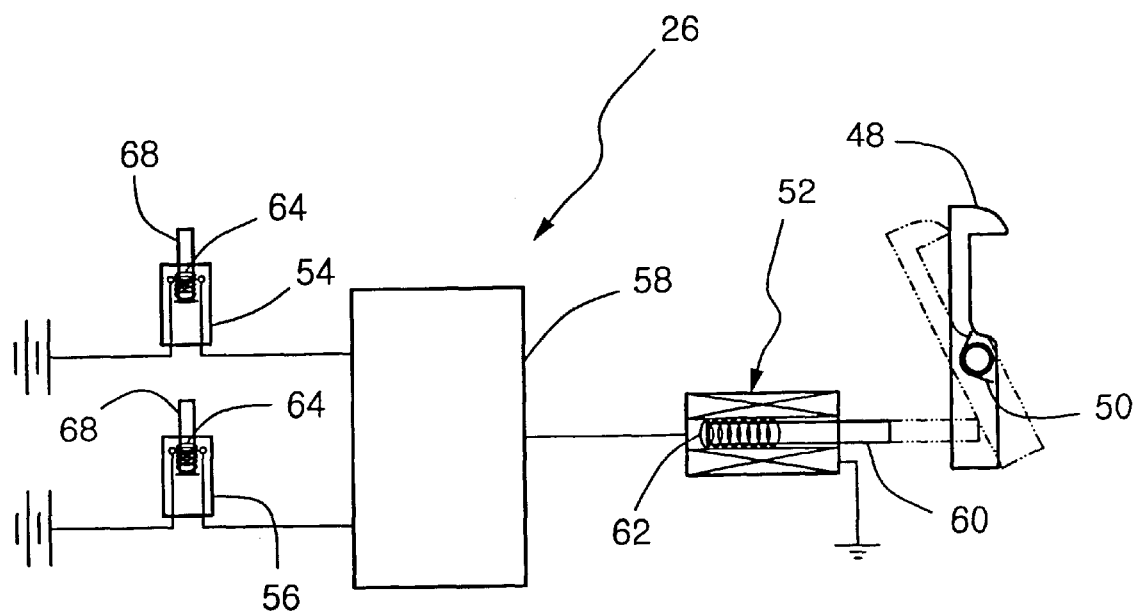
FIG. 4 illustrates an explanatory conceptual view of locking control means of the brake system according to the present invention.

When the brake pedal 14 is operated during normal driving, the interlocking lever 42 is repeatedly rotated within the cut section 44 since the operation range a of the normal condition occurs before the rear range b (see FIG. 3a).

That is to say, since the control arm 30 is coupled with the pivot axis 28 to be pivotally rotated in a free manner, the control arm 30 is not pivotally rotated unless contacted by an interlocking lever 42 of the brake pedal 14.

Furthermore, the control arm 30 is fixed by a plurality of means included in the parking brake system and the elastic return means 34, and the fixed position of the control panel is preserved by the stoppers 38 and 40.

As a result, the brake pedal 14 during the normal drive condition is similar in operation to the conventional art.

Figure 3B:
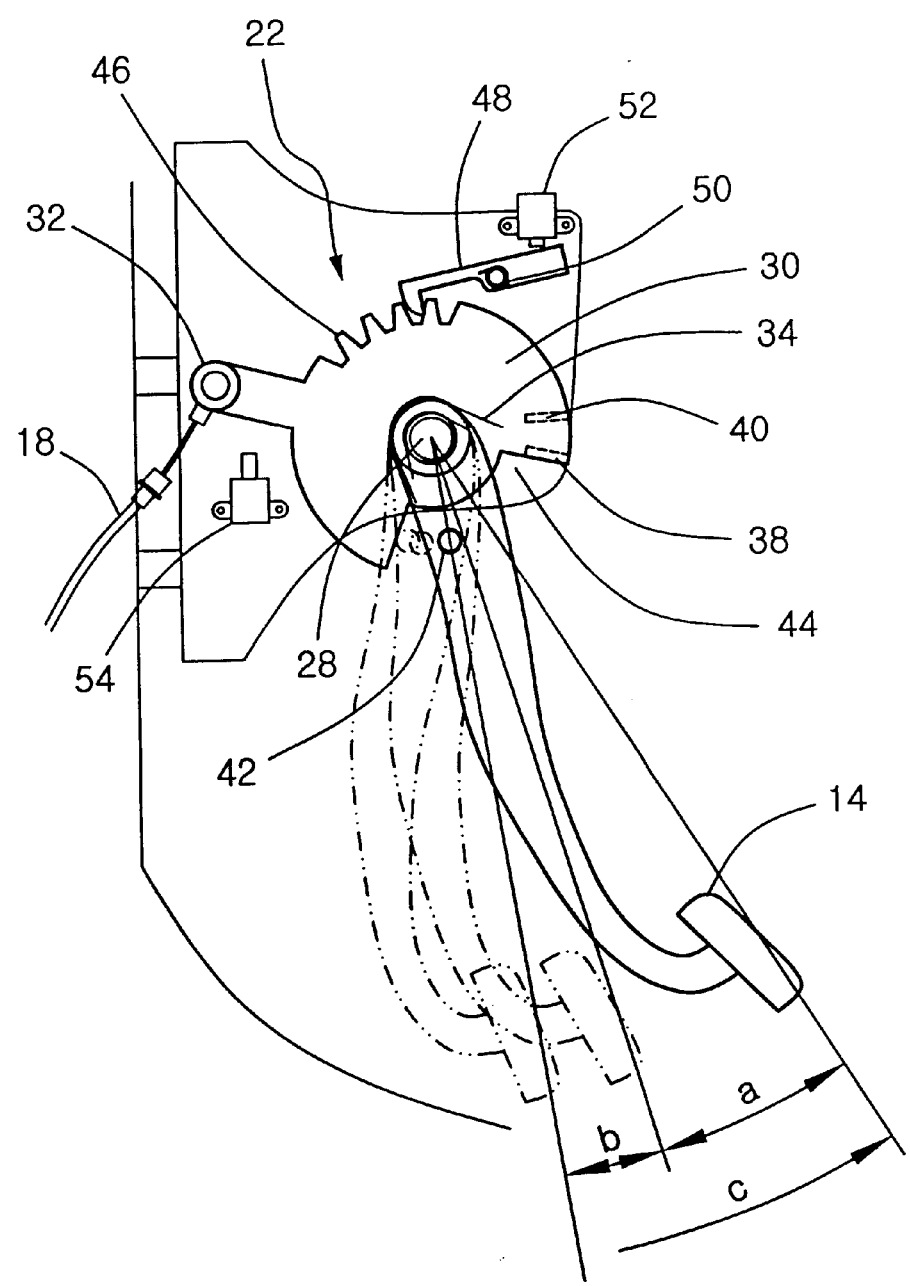

On the other hand, as stated above, if the brake pedal 14 is deeply pushed according to the driver's parking brake operating desire when there is occurred a stop in a so-called stop frequent operation, and thus if it is exceeded beyond the normal operation range a and into the rear range b, the interlocking lever 42 pivotally rotates the control arm 30 (see FIG. 3b).

The locking means 22 is operated while the control arm 30 is pivotally rotated, such that the latch groove 46 is engaged with the latch lever 48 and the parking brake switch 54 is contacted. Therefore, the locking control means sends a signal as a control precondition.

Once the foot is removed from the brake pedal 14, the brake pedal 14 is returned by the return spring 66. However, the parking brake is continuously operated since the control arm 30 is prevented from being returned by the locking means 22 (see FIG. 3b).

The driver can confirm whether the parking brake is operated through vibrating sound which is caused when the latch groove 46 and the latch lever 48 are engaged with each other and through lighting of the brake operation lamp (not shown) in the instrument board, which is caused by the parking brake switch 54.

Thereafter, when the accelerator pedal 24 is pushed for vehicle drive, a power is supplied to the actuator 52 by a signal of the accelerator switch 56 and therefore the actuator 52 pushes the latch lever 48.

Figure 3C:
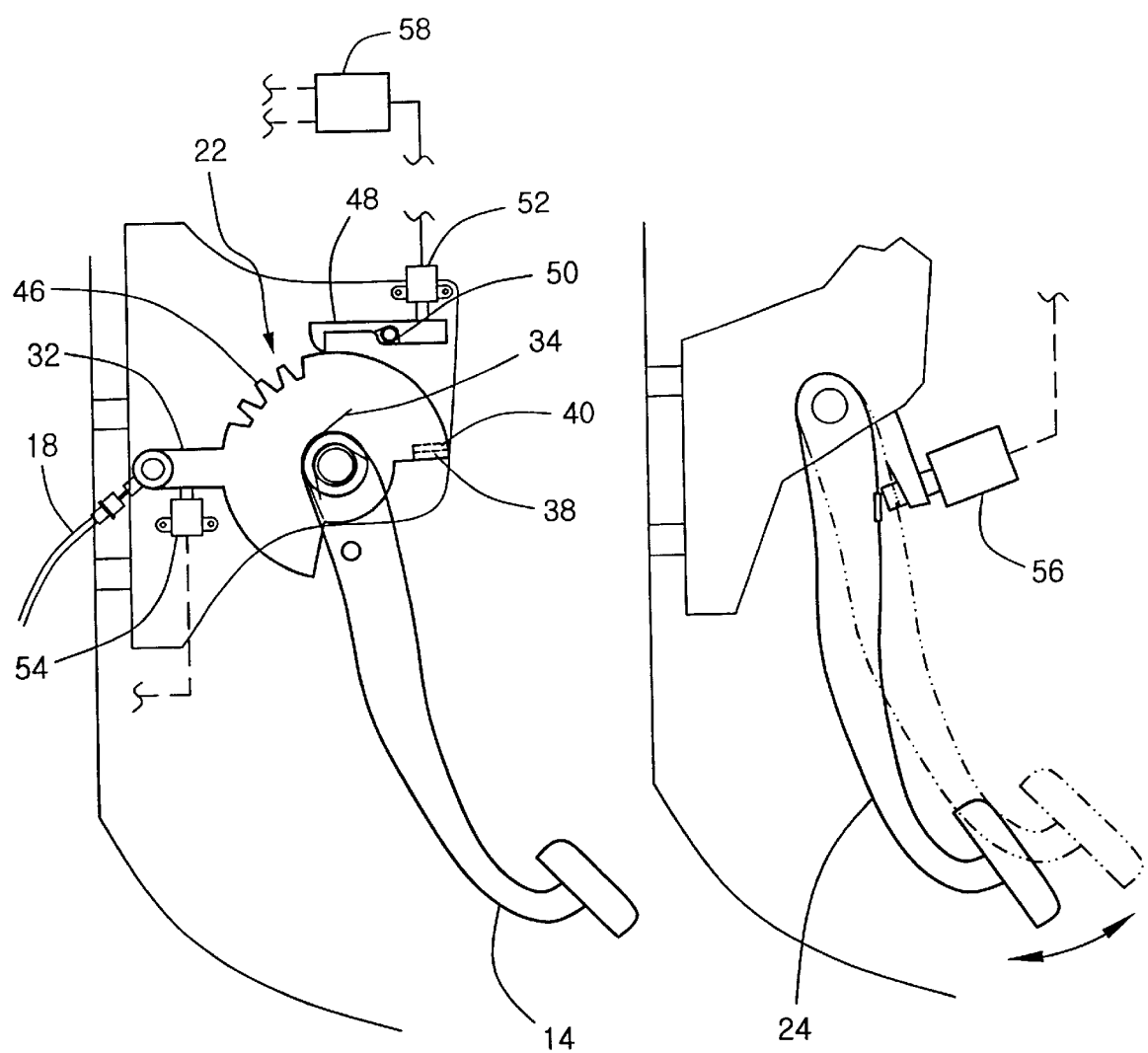

Hence, the engagement between the latch lever 48 and the latch groove 46 is released, the control arm 30 is returned to the initial position by the elastic return means 34 and the stoppers 38 and 40, and the engagement of the parking brake is released (see FIG. 3c).

As a consequence, the parking brake can be operated and released by operating the brake pedal 14 and the accelerator pedal 24 in the conditions where stopping and driving are repeated.

On the other hand, when a power transmitting line of the brake is seriously damaged and the main brake suffers difficulty in operation, if the shocked driver pushes the brake pedal 14 out of his/her deeply ingrained driving habit, the parking brake is accordingly operated and the parking brake is substituted for the main brake.

Therefore, according to the present invention, since the parking brake is interlocked by the brake pedal 14, the type of brake body and the type of transmission medium of the power transmitting line used do not matter at all, and the present invention is applicable to all the brake systems of vehicles with the parking brake using the cable or the brake pedal 14.

As stated above, the brake system of a vehicle according to the present invention has an advantage of improving stability in vehicles since the parking brake can be interlocked with the brake pedal of the main brake and thus the parking brake which is an auxiliary brake can be substituted for the main brake when the main brake body is critically damaged without separate operation means by using only the brake pedal.

Moreover, the present invention has another advantage of improving convenience in vehicles since the parking brake can be operated and released by operating only the accelerator pedal and the brake pedal in the so-called stop frequent operation.

The forgoing embodiments are merely exemplary and are not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. A brake system of a vehicle comprising:

a brake pedal being included in a brake pedal assembly which operates a main brake body;

parking brake interlocking means for operating a cable of a parking brake in a brake pedal operation rear range in excess of a brake pedal operation range during normal driving when the main brake body is operated by the brake pedal;

locking means for preventing the parking brake interlocking means from being returned so that once the parking brake is operated by the parking brake interlocking means the parking brake remains operated even when the brake pedal is released; and locking control means for controlling the locking means so that once the parking brake is operated the locking means may be released by an accelerator pedal.

2. The brake system of claim 1, wherein the parking brake interlocking means includes a control arm which is coupled with the cable to operate the parking brake and also with a pivot axis to be pivotally rotated in a free manner, a cut section which is formed on the control arm to correspond to the brake pedal operation range, an interlocking lever which is integrally coupled with the brake pedal to pivotally rotate the control arm by contacting a rear end part of the cut section when the brake pedal is operated in the rear range, elastic return means which returns the pivotal rotation of the control arm when the control arm is pivotally rotated by the interlocking lever, and stoppers which are formed on a bracket and the control arm to preserve an initial position of the control arm.

3. The brake system of claim 2, wherein the locking means further comprises a latch groove which is formed on the control arm and a latch lever which has the elastic return means for applying an elastic force in a direction where the latch groove and the latch lever are engaged.

4. The brake system of claim 3, wherein the locking control means includes an actuator which is an output means having a release force in excess of the elastic force of the elastic means, a parking brake switch which is an input means for recognizing an operating condition of the parking brake, an accelerator switch which is an input means for recognizing an operating condition of the accelerator pedal, and a control unit which supplies a power to the actuator only when signals of the parking brake switch and the accelerator switch are sent.

* * * * *